A. LEVEDAHL.
TRANSMISSION GEAR AND CLUTCH.
APPLICATION FILED DEC. 2, 1914.

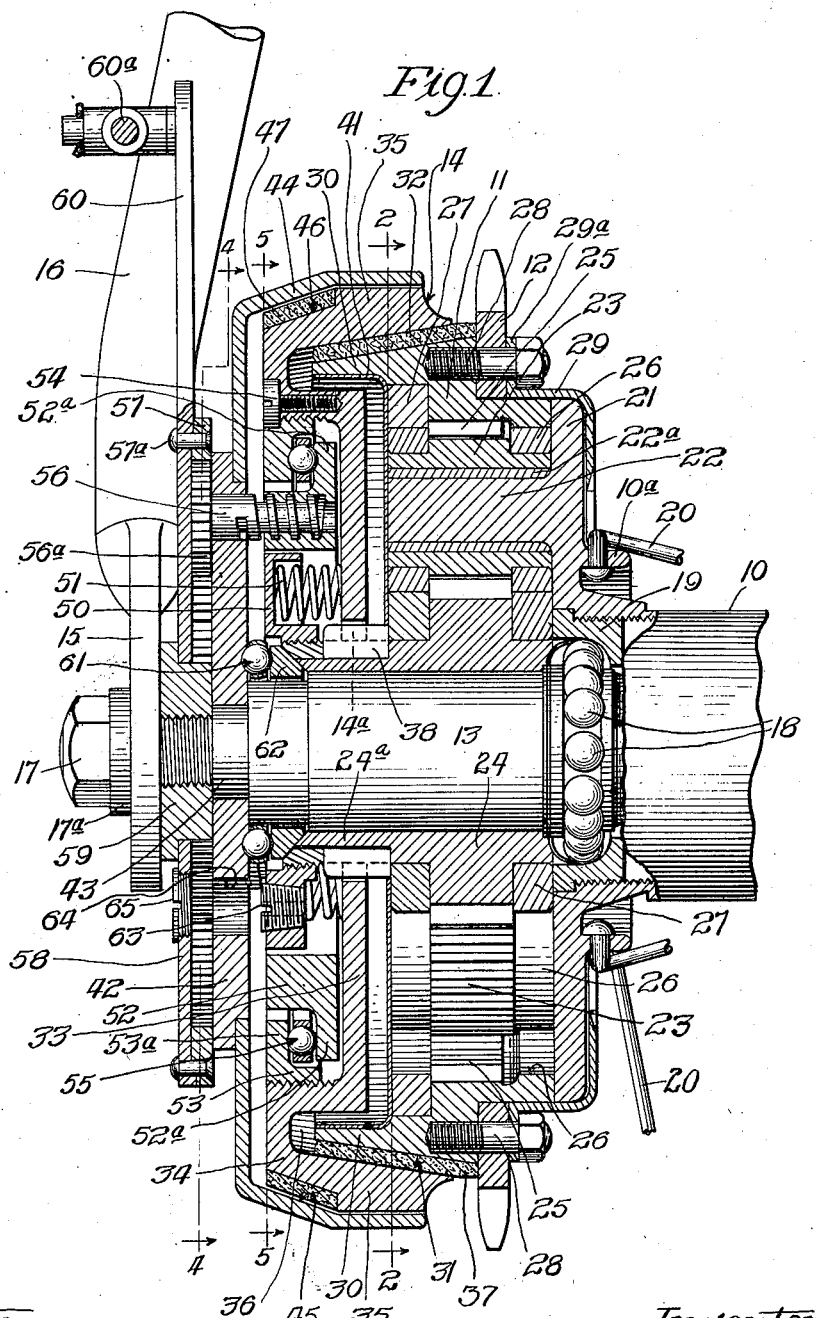

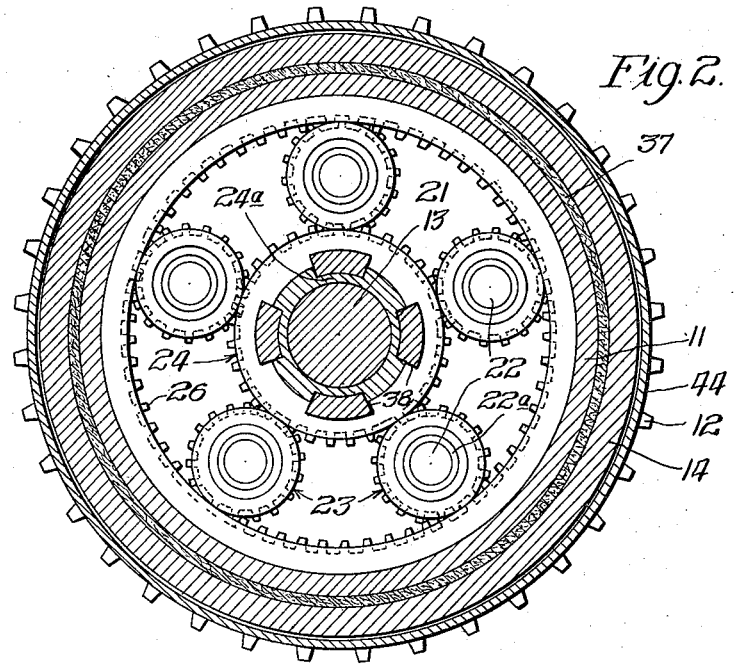
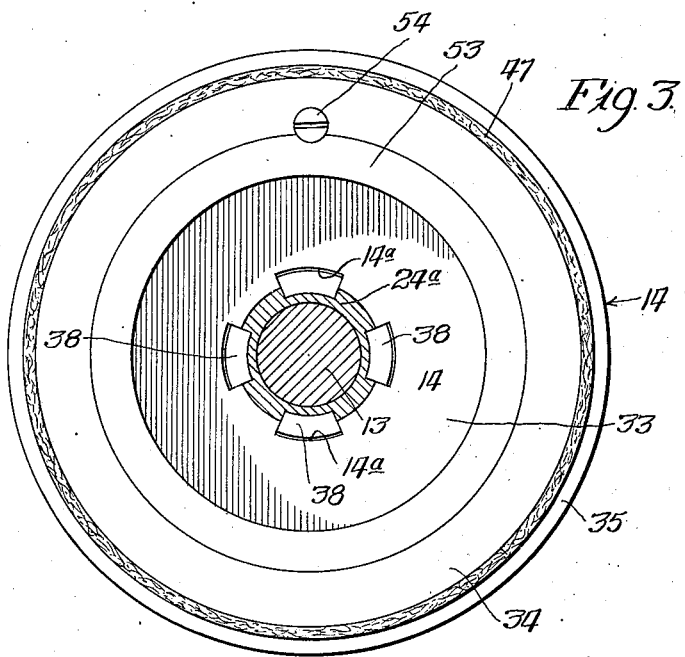

1,170,980.

Patented Feb. 8, 1916.
4 SHEETS—SHEET 3.

Witnesses:
Harry S. Gaither
Charles H. Poole

Inventor
Axel Levedahl
by Poole & Crower
Attys.

A. LEVEDAHL.
TRANSMISSION GEAR AND CLUTCH.
APPLICATION FILED DEC. 2, 1914.
1,170,980.
Patented Feb. 8, 1916.
4 SHEETS—SHEET 4.
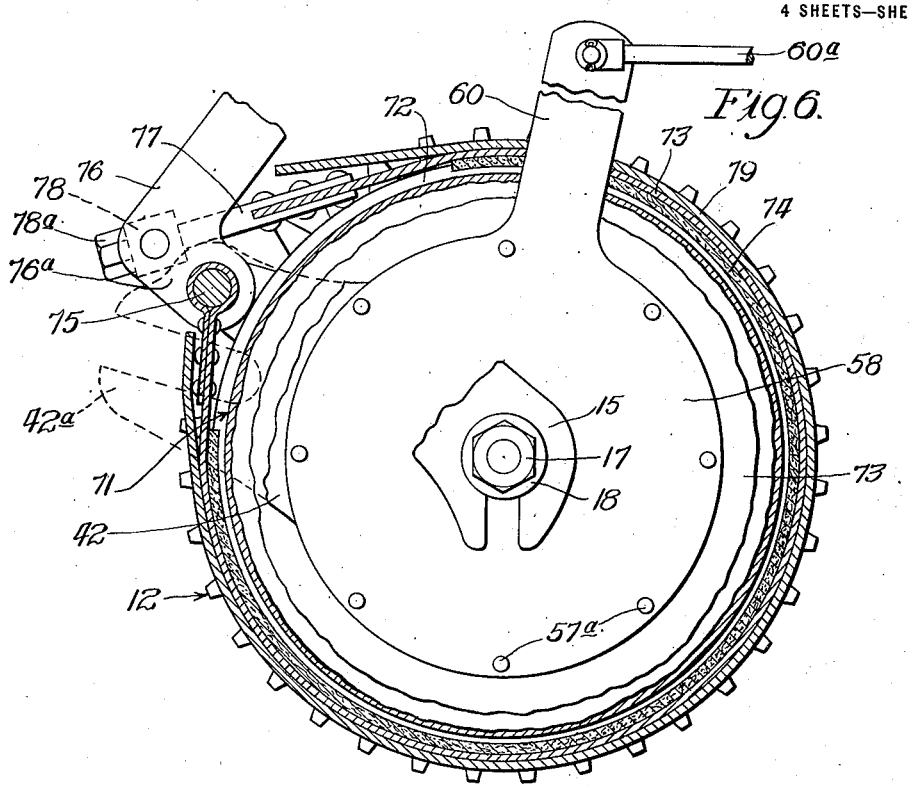
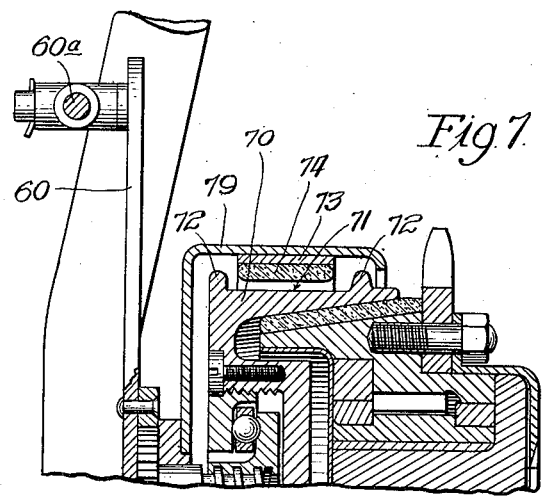
Witnesses:
Harry S. Gaither
Charles H. Poole
Inventor
Axel Levedahl
by Poole & Crowner
Attys.

UNITED STATES PATENT OFFICE.

AXEL LEVEDAHL, OF AURORA, ILLINOIS, ASSIGNOR TO AURORA AUTOMATIC MACHINERY COMPANY, OF CHICAGO, ILLINOIS, A CORPORATION OF DELAWARE.

TRANSMISSION-GEAR AND CLUTCH.

1,170,980.   Specification of Letters Patent.   Patented Feb. 8, 1916.

Application filed December 2, 1914. Serial No. 875,065.

*To all whom it may concern:*

Be it known that I, AXEL LEVEDAHL, a citizen of the United States, and a resident of Aurora, in the county of Kane and State of Illinois, have invented certain new and useful Improvements in Transmission-Gears and Clutches; and I do hereby declare that the following is a full, clear, and exact description thereof, reference being had to the accompanying drawings, and to the letters of reference marked thereon, which form a part of this specification.

This invention relates to improvements in power transmission devices and more particularly to a combined clutch and speed changing mechanism, adapted more especially for use in connection with that class of power propelled vehicles known as motorcycles, or vehicles of like nature.

The features embodied in the construction of a device of the character described, are directed toward the production of a compact and efficient mechanism for connecting and disconnecting the motor from the driven parts or members of the vehicle by the application of a clutch, and for controlling the speed of the vehicle through the medium of said clutch and a system of planetary gearing.

The entire mechanism is designed to be mounted upon and forms a part of the rear or driving axle of the vehicle and to be operated by a suitable lever or levers connected with the mechanism and mounted upon the vehicle in a position easily accessible to the driver or operator.

The novel features of construction of the device and the results or advantages thereof will be understood from the description which follows and from the accompanying drawings, in which—

Figure 4:
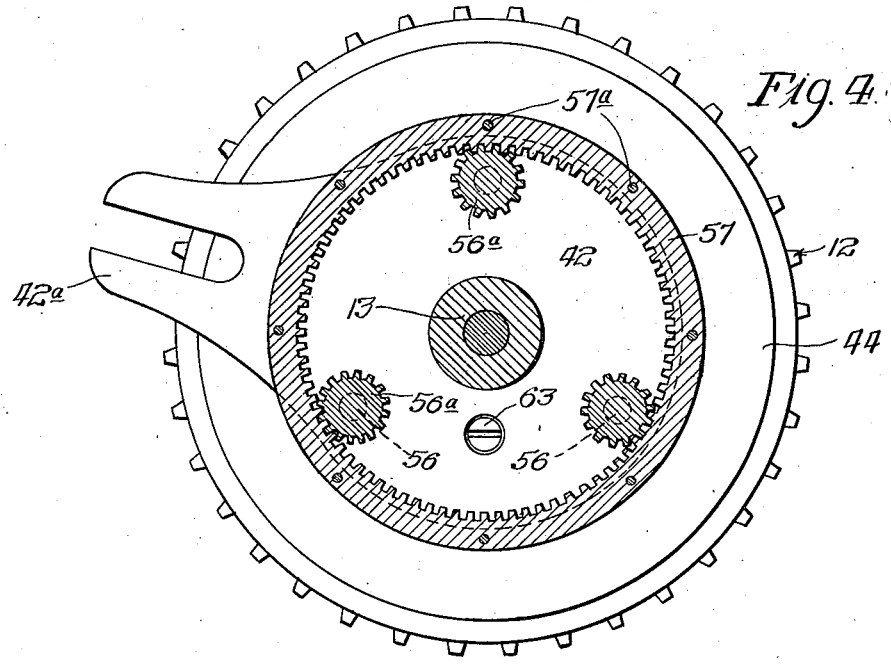
Figure 5:
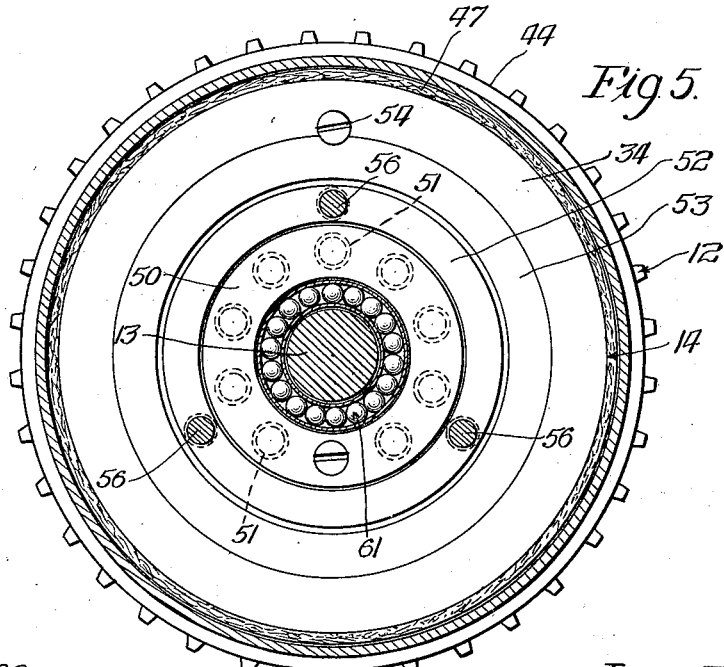

Figure 1 is a transverse sectional view of a clutch and transmission mechanism embodying the features of my invention; Fig. 2 is a view in vertical section, taken on line 2—2 of Fig. 1; Fig. 3 is a view in side elevation of the clutch member separate from the other parts; Fig. 4 is a view in vertical section, taken on line 4—4 of Fig. 1, showing the clutch-operating mechanism; Fig. 5 is a view in vertical section, taken on line 5—5 of Fig. 1; Fig. 6 is a view in side elevation with a portion of the housing removed and clutch member broken away to show a modified form of clutch-operating mechanism; and Fig. 7 is a partial view in cross-section, showing a modified construction of the clutch-operating mechanism.

In the accompanying drawings is illustrated a form of clutch and transmission mechanism embodying the features of my invention, and embracing as its principal parts a primary driven member, in the form of the hub or hub shell 10 of the rear wheel of a vehicle; a rotative driving member 11, in concentric relation with the driven member and comprising an annular body member or clutch cone in driving connection with the motor of the vehicle through the medium of a sprocket wheel 12 fixed to the body member and a sprocket chain (not shown); a system of planetary gearing interposed between the driving and primary driven members, comprising gear teeth formed on said driving member, pinions journaled on said driven member and constituting the intermediate driven members, and a spur gear wheel mounted to rotate on the axle 13 of the vehicle, and, finally, a clutch ring or member 14 adapted to be actuated in a manner to directly connect the driving and driven members, for driving the vehicle at the high speed, and to provide for the operation of the vehicle at the low speed by directing the power from the driving member to the driven member, through the medium of the planetary gearing or intermediate driven members. In addition to the members above described in brief, the device also embodies mechanism for operating or actuating the clutch member, together with other details of construction hereinafter described.

The device embodying the features of my invention is shown in connection with a well known construction for the wheel of a motor-cycle or like vehicle, wherein the axle 13 is supported between the rear forks of the vehicle frame, each end of said axle engaging a slotted yoke member 15 integral with the lower extremity of the vehicle frame fork member 16, one of which members is shown in Fig. 1. The axle is held in position by means of a nut 17 and washer 17ª, the former engaging the threaded extremity of the axle. The hub of the wheel is rotatively mounted upon the axle by means of an anti-friction bearing 18, comprising balls mounted in a race formed by means of grooves in the surfaces of the axle and a bearing ring 19 having screw-threaded connection with the inner surface of the hub or hub shell 10.

The clutch and transmission mechanism is mounted at one end of the hub shell 10 and intermediate the end of the axle and the adjacent series of wheel spokes 20, said spokes being shown in Fig. 1 as secured to a laterally projecting ring 10$^a$ integral with a radially projecting hub flange 21, the latter being preferably in the form of a disk integral with the hub shell 10 and constituting a part of the driven member, as will hereinafter appear. Upon its inner face, the hub flange is provided with a series of annularly arranged stub shafts or journals 22, projecting laterally and at right angles to the inner face of said flange, and preferably formed integral therewith. Each of these stub shafts or journals supports or carries a pinion 23, rotatably mounted thereon, each of said stub shafts being herein shown as provided with a bearing bushing 22$^a$ in the form of sleeves of hardened metal. The pinions 23 are spaced apart at equal distances about a circle concentric with the axle 13, and surround and mesh with a central spur gear wheel 24, rotatably mounted upon the axle 13 and engaging an enlarged bearing surface extending from the antifriction bearing 18 outward to a point some distance beyond the plane of said gear wheel. The central spur gear 24 is further provided with an integral sleeve portion 24$^a$ or extension, which projects outwardly toward the extremity of the axle from the main portion of the gear wheel. The function of this extended sleeve 24$^a$ will be further described in connection with members of the mechanism hereinafter referred to. The driving member 11 surrounds the pinions 23, and is provided with an internal gear wheel 25 meshing with said pinions, said gear wheel being preferably formed by cutting gear teeth upon the inner annular surface of the driven member.

The internal and spur gear wheels 25 and 24, and the pinions 23 interposed between said gear wheels, constitute the planetary system of gearing before referred to. Each gear wheel and pinion is provided with bearing tracks or surfaces 26 formed at the outer margin of each gear wheel or pinion and adjacent to the ends of the teeth thereof, the same preferably comprising rings 27 of hardened metal, inserted within grooves formed at the ends of the gear wheels or pinions, the peripheral surfaces of said rings coinciding substantially with the pitch diameter of its respective gear wheel or pinion. These bearing surfaces are adapted to have rolling contact with each other, as the several members of the planetary gearing are rotated, and act to maintain the members in vertical alinement and in concentric relation, and further, provide, in effect, roller bearings by means of which each gear member acts to support the other gear members with which it has meshing engagement. This particular feature of construction has been fully described in a prior application for "Gearing", filed by me on September 4th, 1914, and bearing Serial No. 860,130, and therefore need not be further described, except to point out that by reason of this construction the driving member is supported upon the axle 13 through the medium of the bearing rings or surfaces of the intermediate spur gear and pinions.

Referring more in detail to the construction of the driving member or clutch cone 11, the same comprises an annular ring rotatively mounted adjacent to and in abutting relation at one margin with the marginal portion of the hub flange. The sprocket wheel 12 is rigidly attached to the driving member, and preferably consists of a toothed ring adapted to fit within an annular groove formed in the outer surface of the member and adjacent to the hub flange 21 of the driven member or hub shell 10. A plurality of cap screws 28 extend through the ring-shaped sprocket wheel 12 and into the driven member, rigidly securing the sprocket wheel thereto. The said screws 28 further act to secure an oil and dust ring 29 against the face of the sprocket wheel, said ring consisting of an annular casing of sheet metal provided with a flange 29$^a$ adapted to engage the face of the sprocket wheel 12 and through which the cap screws 28 extend. The oil ring or casing extends laterally from the sprocket wheel and inwardly over the periphery of the flange 21 of the driven member, terminating adjacent to the point of connection of the spokes 20 with said flange 21, and in this manner incloses the moving parts ordinarily exposed to dust and dirt, thereby preventing the dust from entering the interior of the mechanism, and also preventing the escape of oil therefrom. The driving member or clutch cone 11 is formed to provide an annular flange 30 projecting from the body portion thereof in a direction away from the sprocket wheel 12, the outer or peripheral surface of the flange 30 and main or body portion of the clutch cone 11 being provided with an inclined or tapered surface 31 extending from the sprocket wheel 12 to the extremity of said flange 30. This surface is inclined or tapered inwardly from said sprocket wheel 12, and constitutes the clutching surface or cone of the clutch cone, the same being not unlike that used in the well known cone-type of clutch devices.

The clutch member 14, which is designed to be shifted laterally to engage and disengage the clutch cone, is preferably constructed in the form of a disk (Figs. 1 and 3) provided at its periphery with an enlarged channel-shaped, annular, flanged portion 34, the outermost portion or clutch ring 35 extending laterally beyond the plane of the disk proper to a point within a short distance of the sprocket wheel. This clutch ring 35 surrounds the adjacent portion of the clutch cone 11, consisting of the flange 30 and adjacent portion of the body member thereof, said flange 30 projecting into the space 36 formed by the channel-shaped, flanged portion 34 of the clutch member. The inner annular surface of the clutch ring 35 is tapered to correspond with the inclination of the tapered surface 31 of the clutch cone and is parallel therewith. Between these surfaces, and preferably attached to the surface of the clutch ring 35, is a friction or brake band 37 of suitable material, as for instance of leather. The central portion or disk of the clutch member, which supports the channel-shaped flange 34, is provided with a central aperture through which extends the axle 13 and the extended portion or sleeve 24$^a$ of the central spur gear 24 (Fig. 3). The clutch member is shiftably mounted upon the extension sleeve 24$^a$ of the central spur gear in the following manner: About the periphery of the central aperture, the clutch member is provided with a series of notches 14$^a$, which engage a series of lugs 38, spaced about the surface of said sleeve 24$^a$ and projecting radially into the notches 14$^a$ of the clutch member. The lugs preferably consist of pieces secured within longitudinally extending slots formed in the surface of said sleeve, as shown in Fig. 3. The length of these lugs is somewhat greater than the thickness of the disk 34, so that the latter may be shifted axially upon the central gear through a limited distance and at the same time be connected thereto by means of the interlocking lugs and notches, so that the clutch member and central spur gear are constantly connected together so as to prevent relative rotative movement between them. It is now apparent, by the arrangement of the clutch member 14, with relation to the clutch cone 11, and the mode of connection of the former with the central spur gear, that, by imparting an axial or shifting movement to the clutch member in the direction of the clutch cone, said clutch member and clutch cone may be connected together or engaged by the frictional contact between the corresponding tapered surfaces thereof and through the medium of the friction-producing brake band lining 37, and, by reason of the interlocking connection of the clutch member and the central spur gear, said clutch member acts to connect or lock the central gear to the driving member or clutch cone. In the same manner, the shifting of the clutch member in the opposite direction disconnects or disengages the driving member and central spur gear. The result accomplished by this particular movement of the clutch member, will be hereinafter set forth in detail—it being sufficient at this time to bear in mind that the clutch member is in all positions connected with the central spur gear.

In order to prevent oil from escaping into the space between the clutch member 14 and the clutch cone and inner faces of the gear wheels and pinions of the planetary gearing, an oil guard or plate 41 is provided (Fig. 1), the same comprising an annular sheet of metal provided with a central aperture through which extends the axle 13 and the extension 24$^a$ of the central spur gear, and at its periphery with a flange 40$^a$, which bears tightly against the inwardly facing surface of the flange 30 of said clutch cone. This plate or guard is secured to the driving member in any suitable manner, and serves to prevent the oil or grease, which is supplied to the gear members, from reaching the clutch surfaces, thereby interfering with the proper clutching action of the friction surfaces and otherwise injuring the material of which the friction band 37 is composed.

Before describing the mechanism employed for operating the clutch member, it is thought desirable to set forth the means by which the clutch member is restrained or held from rotative movement when the same is released from clutching engagement with the clutch surface of the driving member. Mounted upon the axle, adjacent to its outer extremity, is a brake disk 42, the same comprising a flat, relatively thick plate extending at right angles to the axle and fixed upon said axle to maintain it in stationary position, and to prevent its rotation about the axle. To accomplish this end, the disk 42 is provided with a forked arm 42$^a$ (Fig. 4), adapted to be secured to a portion of the vehicle frame in any desirable manner. Rigidly attached to the periphery of said brake disk is a casing or housing 44, consisting of a dish-shaped member, having an annular portion extending outwardly and a flange portion extending laterally, at right angles to the brake disk, in a manner to substantially inclose the clutch member 14, there being but a small space separating the adjacent surfaces of said housing and clutch member. A portion of the housing wall is inclined or tapered to provide a beveled annular surface adjacent to the outer peripheral surface of the clutch ring 35 of said clutch member 14, as shown at 45, Fig. 1, the inner surface of the inclined or tapered portion being substantially parallel with the braking surfaces of said clutch member 14 and clutch cone 11. In like manner, the adjacent peripheral surface of the clutch member is inclined to the same degree, said surface being provided with a groove 46 within which is secured a friction or brake band 47 of suitable material. The inclined surfaces of said housing 44 and clutch member 14 form, in effect, a cone clutch wherein the beveled surface of the housing forms the stationary member, which is adapted to be engaged by the adjacent braking surface of the clutch member as the latter is shifted in contact therewith. It is now apparent that, by shifting the clutch member from engagement with the friction surface of the clutch cone or driving member 11 and into engagement with the braking or clutch surface of the fixed housing 44, clutching engagement takes place, thus preventing the rotation of the clutch member, which in turn prevents the rotation of the central spur gear, by reason of its interlocking connection therewith. The object of maintaining the clutch member stationary when disengaged from the clutch cone, will be understood when the operation of the device is more fully described. However, it is to be noted at this point that the clutch member may occupy a neutral position, that is, a position in which it engages neither the braking surfaces of the clutch cone nor of the housing.

The particular operating mechanism or devices employed for shifting the clutch member, comprise parts arranged as follows: Mounted upon the extremity of the extension 24ª of the central spur gear, is a collar 50 provided with an annular channel facing in the direction of the clutch member. This collar is rigidly mounted upon said extension 24ª of the spur gear, and preferably by screw-threaded engagement therewith. Between the collar 50 and the adjacent surface of the clutch member, and spaced at equal distances about the axle, are a plurality of coiled springs 51, the ends of each spring bearing against said disk 34, and held within the channel of the collar 50. These springs exert a constant tension upon the clutch member, and constitute the means for shifting the clutch member into clutching engagement with the driving member 11. These springs are constantly in action, tending to maintain said clutch and cone members in clutching engagement. Surrounding the collar 50, and substantially in the same plane therewith, is a shifting ring 52, having at its periphery and adjacent to its inner face an annular bearing flange 52ª. Surrounding the shifting ring 52, is a flanged collar 53 (Figs. 1 and 3), rigidly connected to the clutch member 14, by the provision upon its outer peripheral surface of screw threads which engage a screw-threaded portion formed in the inwardly facing surface of the innermost portion of the channel-shaped flange 34 of said clutch member. A screw 54 is preferably inserted in the clutch member, its head being countersunk in the clutch member and in the marginal portion of the flanged collar 53, thereby insuring rigid connection between said members. The flange 53ª of said collar 53 projects radially inward in parallel relation to the flange 52ª of the shifting ring 52, and spaced laterally therefrom. Within the space thus formed between the opposing faces of said flanges, there is mounted an antifriction bearing 55, the same comprising a series of bearing balls mounted within a suitable cage member and engaging grooves or races formed in the faces of said flanges 52ª and 53ª.

Extending through the shifting ring 52, and spaced apart at equal intervals, are a series of threaded bores into which extend worm-screws 56, said screws and bores being shown as provided with square threads. In Fig. 4, these worm-screws are shown as being three in number and arranged at angles of 120 degrees apart. Each of said worm-screws projects from the threaded bores in the shifting ring and extends through apertures in the brake disk, said disk serving as a bearing for each of said screws, whereby the same are rotatively supported. At the outer extremities, the worm-screws are provided with small toothed pinions 56ª, preferably integral with said screws and located exterior of the brake disk, and in abutting relation, at one face, with the same. These pinions have meshing engagement with an annular gear ring 57, which surrounds the pinion, said gear ring being rigidly secured to the inner face of a circular plate 58 by means of a plurality of rivets 57ª. The plate 58 is rotatably mounted upon a flanged collar 59, mounted in fixed relation upon the axle 13, intermediate the yoke member 15 of the vehicle frame and the brake disk 42, said flanged collar being preferably provided with screw threads engaging the screw-threaded extremity of the axle. Integral with the plate 58 is a vertically extending arm or lever 60, to the end of which is adapted to be attached the control rod 60ª or other suitable operating devices.

The operation of shifting the clutch member 14 into clutch engagement with the clutch cone or driving member 11, obviously produces an endwise or lateral pressure or thrust upon said clutch cone, tending to force the latter against the outer margin of the annular hub flange 21 of the driven member or hub shell 10, and at the same time there is exerted upon the central spur gear 24 a counter-thrust or pull in the opposite direction, by reason of the tension exerted by the clutch springs 51 against the collar 50, hereinbefore described as fixed to the extremity of the extension 24ª of the central spur gear 24. To compensate for this end thrust, to which the central spur gear is subjected, a thrust bearing 61 is provided intermediate the end surface of said extension 24ª and the fixed brake disk 42. This thrust bearing is of the usual construction, comprising a plurality of ball bearings mounted in an annular cage, said ball bearings being adapted to engage grooved races formed in the inner face of the brake disk 42 and within the face of a thrust collar 62 provided with a beveled face in bearing contact with the similarly beveled extremity of the spur gear 24.

In addition to the members thus far described as comprising the mechanism embodying the features of my invention, further means are provided for lubricating the members of the clutch operating or shifting mechanism. This means consists of a removable screw plug 63 inserted in an aperture extending through the collar 50 immediately below the axle, an aperture 64 in the brake disk 42, and a screw plug 65 removably mounted in an aperture formed in the outer plate 58 of the clutch operating mechanism. These apertures are adapted to be brought into alinement and the plugs removed, thereby permitting oil to be introduced into the space occupied by the movable members of said clutch member operating mechanism.

The operation of the clutch and transmission mechanism, of the form hereinbefore described, may be understood from the following: In Fig. 1 of the drawings, the clutch member 14 is shown as in clutching engagement with the driving member or clutch cone 11 by reason of the frictional or clutching contact between the frictional surfaces of said members. In this position, as will be presently seen, the driving member 11 is directly connected with the driven member or hub shell 10, and, assuming that the driving member is being rotated at a constant speed, the clutch member will now rotate with it, and likewise the central spur gear 24, since said clutch member is in interlocking engagement with the central spur gear wheel 24, which is itself loosely mounted on the axle 13 and therefore free to rotate. The clutch cone or driven member 11 and said spur gear wheel are, in this manner, connected or locked together, and therefore will revolve upon the axle at the same rate of speed. Now the pinions 23, which are carried by the driven member, namely, upon the stub shafts 22 of the hub flange 21, and which mesh with the internal gear wheel 25 of the clutch cone and the central spur gear wheel 24, are unable to rotate relatively to said annular and spur gear wheels, because, as before stated, these gears are rotating at the same rate of speed. The result is therefore that the pinions revolve about the axle with the driving member and the spur gear wheel, and merely serve to lock the driven member or hub shell 10 to the driving member. In this manner, all members, including the driving member 11, the clutch member 14, the central spur gear wheel, and the driven member or hub shell, rotate as a unit about the axle. The clutching engagement between the clutch member and clutch cone is obviously accomplished by the clutch springs 51, which act to shift the clutch member 14 in the direction of, and to hold the same in clutching engagement with, the clutch cone.

The manually operable device, including the shifting ring 53 and worm-screw 54, acts to move or shift the clutch member, against the opposing action of the clutch springs, out of clutch engaging position into clutch releasing position, into neutral and low speed positions. The clutch releasing mechanism operates as follows: By revolving the disk 58 in a counter-clockwise direction, by means of a control lever and rod 60ª connecting said lever with the manually operable control lever, the worm-screws 56 are rotated in the same direction, by reason of the meshing engagement of the small pinions 56ª of said worm-screws with the internal gear 57 secured to said disk 58. The rotation of said worm-screws 54 imparts a lateral movement, in an outward direction, to the shift ring 52, by reason of the screw-threaded engagement between said ring and worm-screws, said movement being transmitted to the clutch member 14 through the medium of the antifriction bearing 55 and the ring 53 rigidly connected with said clutch member. The further movement of the clutch member from clutch releasing position, carries said member into frictional contact with the fixed housing 44, through the medium of the outer peripheral friction surface or brake band 47 of said clutch member and the inner surface of the beveled or inclined portion 45 of said housing. The contact or clutching engagement between the clutch member 14 and the fixed housing 44, obviously brings the clutch to a stationary or non-rotative position, and maintains the same in that position as long as these surfaces are held in contact. The central spur gear 24 is likewise restrained from rotation by reason of its connection with the clutch member 14, and as a result said central gear wheel is held in non-rotative position upon the axle. The central spur gear wheel now assumes its character as the stationary gear member of the planetary gearing, whereby the transmission of power through said gearing is effected, and consequently the driving of the vehicle at low speed. With the members now in position for driving at low speed, the rotation of the driving member 11 imparts a rotative movement to the pinions 23 of the hub flange 21, by reason of the meshing engagement of said pinions with the internal gear 26. The central spur gear being fixed or non-rotative, the pinions will rotate upon their journals and at the same time revolve about the central gear, thus transmitting to the hub shell or driven member 10 a rotative movement, of a less rate of speed than that of the driving member 11.

In addition to its function as a speed-changing device, the clutch member may be manipulated so as to assume the function of an ordinary clutch device, adapted to connect and disconnect the motor and the driven parts of the vehicle. To disconnect the driving and driven members, the clutch member is moved to a position intermediate its positions of clutching engagement with the driving member and housing. In this position of the clutch member, the central gear is free to rotate upon the axle, and at the same time is not connected with the driving member, so as to lock the pinions between said central spur gear and the annular gear, hence no power can be transmitted from the driving to the driven member, and therefore said driving and driven members are entirely disconnected.

The construction hereinbefore described may be departed from by the use of a separate and independently operated device for preventing the rotation of the clutch member, when shifted to the position for driving at the low speed. Such a device preferably consists of braking mechanism, operated independently of the clutch shifting mechanism, to engage the clutch member when disengaged from the clutch cone or driving member 11. In Figs. 6 and 7, is shown a modified form of the device embodying such an arrangement of parts. Referring to the above mentioned figures, the clutch member 70 is provided with an annular bearing surface 71 of uniform diameter, and with radially projecting flanges 72, 72 at the margins thereof. Surrounding the clutch member is a flexible metal brake band 73, provided with a friction lining or strip 74 of suitable material adapted to engage the surface 71 of the clutch member. One end of the brake band 73 is attached to a fixed pin 75 secured to the forked arm 42ª of the stationary brake disk 42. The pin 75 also serves as a journal for a brake band operating lever 76, preferably provided at its lower end with an angularly bent portion 76ª, said pin extending through the end of said bent portion, and acting to pivotally support the lever. Adjacent to the pivot pin 75, and at a short distance therefrom, is secured the opposite end of the brake band 73, said end being preferably secured to a short rod 77, which extends through and has screw-threaded engagement with a swivel block 78 pivotally mounted upon the lever 76. A nut 78ª at the end of said rod 77 permits the proper degree of adjustment in the length of the brake band. In the modified form of the device, the housing 79 acts only as a protective casing that therefore can be constructed of less thickness of metal. An aperture is provided in the housing to permit the ends of the brake band to extend outwardly therefrom and to be connected with the lever 76, as shown in Fig. 6. The lever 76 extends upwardly in a general upward direction and terminates within convenient access of the operator.

It is quite obvious that by swinging the lever 76 about the pivot pin in a counter-clockwise direction, the circumference of the brake band is decreased and gradually tightens around the clutch member, thus acting to prevent its rotation in the same manner, and for the same purpose, as described in the so-called "double cone" form of clutch before described, wherein the housing acts as a stationary clutch surface, and the operation of the device is entirely controlled by a single lever.

It is to be understood that the remaining parts of the device are identical with those hereinbefore described and illustrated in the remaining figures of the drawings, and that the operation is quite the same, except that the clutch member and spur gear are retained in stationary position by means operated independently of the clutch shifting mechanism.

Among the advantages secured by the use of a mechanism embodying the features of my invention, that deemed of importance is that of the combination, in a single, compact structure, of a device capable of fulfilling the double function of a clutch and speed changing device, whereas heretofore each of these devices constituted separate mechanisms mounted on different parts of the vehicle and having independent operating levers or devices. The advent of a single device adapted to replace two devices, is a distinct advance in the art of vehicle manufacture, in that the cost of manufacturing and maintenance is greatly decreased, the efficiency and ease of operation increased in the same degree. Furthermore, the device permits the motor to be directly connected with the sprocket wheel, without the presence of an intermediate clutch mechanism, which is ordinarily employed in connection with the motor crank-shaft.

The device is exceedingly compact and hence occupies but a small space and requires but a single lever (where the "double cone" type of clutch is employed) to effect the clutching and speed changing operations.

The particular features of construction employed are particularly well adapted to secure a well balanced, dependable and efficient mechanism, particularly as regards the degree of slippage available during the clutching operation and the amount of power necessary to effect and maintain the frictional contact between the friction members. This feature will be understood when it is remembered that the clutching operation is in reality the connecting of the internal gear 25 of the driving member 11 and the central spur gear 24, through the medium of the clutch member 14. The diametrical ratio between said gear members is necessarily large and hence the provision of a clutch member, whose clutching surface is of a diameter as great if not greater than that of the internal gear 25, affords the maximum degree of working leverage, that is, the advantage of leverage secured by a lever arm of maximum length, said lever arm being represented by the radius of the friction or clutching surface of said clutch member. This large degree of working leverage is of considerable advantage in the operation of the clutch member and of the device as a whole, in that it increases the amount of slippage that may take place between the friction surfaces during the period or interval of time that the clutch member is brought up to the speed of the driving member and before actual connection is effected, by reason of the large circumference of the frictional surfaces of the friction members. The clutching operation is therefore accomplished gradually, thereby avoiding sudden jars or shocks, and with the minimum degree of power exerted by reason of the leverage advantage in the clutch members. It necessarily follows that the wear upon the friction surfaces is also materially decreased, by reason of the large degree of leverage secured.

A further advantage is to be noted in connection with the provision of a clutch member of comparatively large diameter, namely, that it permits an exceedingly large clutching or friction surface to be obtained, whereby the gripping effect is increased in a corresponding degree, to the end that less power is required to effect the clutching operation and to maintain the frictional surface in frictional engagement, and less wear upon the surfaces results. For this reason springs of lighter construction may be employed, and less frequent renewal of the friction material or brake lining necessary.

An important advantage is also gained by the employment, in the change-speed and clutch device described, of the form of change-speed gearing illustrated, wherein the external, annular driving member, the centrally arranged spur-gear wheel, and the intermediate gear pinions are severally provided with annular bearing surfaces in contact with each other, for the reason that by the action of such bearing surfaces the said driving member is supported by what are in effect roller bearings, and the several parts forming such change-speed gearing are held in proper concentric relation to each other without the use of parts that would add to the space occupied laterally thereby, so that the entire device, including the clutch members and the operating means therefor, located at one side of the change-speed gearing, will be so compact as to be conveniently available for use in connection with the driving wheel of a motor-cycle, or for other like uses.

It is to be understood that either type of clutch member and operating device may be employed and other departures made from the construction herein described and shown, without departing from the spirit of my invention, and therefore I do not wish to be limited in the scope of my invention except in so far as such limitations are expressed by the language of the appended claims.

I claim as my invention:

1. In a device of the character described, the combination of a driving member, a driven member, planetary gearing, comprising a gear wheel connected with one of said driving and driven members, a pinion meshing with said gear wheel and journaled upon the other of said driving and driven members, and a rotative spur gear wheel meshing with said pinion, and a clutch member mounted on said spur gear wheel and adapted to be shifted relatively to the same to connect and disconnect said first mentioned gear wheel and said spur gear wheel.

2. In a device of the character described, the combination of a driving member, a driven member, planetary gearing, comprising a gear wheel fixed to one of said driving and driven members, a pinion meshing with said gear wheel and journaled upon the other of said driving and driven members, and a spur gear wheel meshing with said pinion, a clutch member mounted on said spur gear wheel and adapted to be shifted to connect and disconnect said first mentioned gear wheel and said spur gear wheel, and a friction producing member acting on said clutch member, when disconnected from said first mentioned gear wheel, to prevent the rotative movement of said spur gear wheel.

3. In a device of the character described, the combination of a bearing member, a driving member provided with gear teeth, a driven member, a gear wheel rotatively mounted on said bearing member, a pinion journaled on said driven member and meshing with said gear wheel and gear teeth of the driving member, and a clutch member operatively connected with said gear wheel and adapted to be shifted relatively to said gear wheel to lock the same to said driving member or in fixed position upon said bearing member.

4. In a device of the character described, the combination of a bearing member, a driving member, a driven member, planetary gearing interposed between said driving and driven members, one of the gear wheels of said planetary gearing being adapted to normally rotate on said bearing member, a clutch member mounted on said gear wheel of the planetary gearing and adapted to be shifted relatively to the same to alternately connect and disconnect said driving member and planetary gear wheel, and means engaging said clutch mechanism for restraining said gear wheel from rotation when disconnected from said driving member.

5. In a device of the character described, the combination of a driven member, a driving member provided with an annular friction surface, planetary gearing, comprising a spur gear wheel, an internal gear wheel fixed to said driving member, and a pinion meshing with said spur and internal gear wheels and journaled on said driven member, and a clutch member mounted on said spur gear wheel and adapted to be shifted to engage and disengage said friction surface of said driving member.

6. In a device of the character described, the combination of a driven member, a driving member provided with an annular friction surface, planetary gearing, comprising a spur gear wheel, an internal gear wheel fixed to said driving member, and a pinion meshing with said spur and internal gear wheels and journaled on said driven member, a clutch member mounted on said spur gear wheel and adapted to be shifted to engage and disengage said friction surface of the driving member, and friction producing means adapted to engage said clutch member when disengaged from the driving member, to restrain said spur gear wheel from rotation.

7. In a device of the character described, the combination of a bearing member, a gear wheel rotatively mounted on said bearing member, a driven member, a driving member, planetary gearing interposed between said driving and driven members, embracing together with said spur gear member, an internal gear wheel fixed to said driving member and a pinion meshing with said internal gear wheel and spur gear wheel and journaled on said driven member, and a clutch member shiftably mounted on said spur gear member and adapted to frictionally engage said driving member adjacent to its periphery.

8. In a device of the character described, the combination of a driving member provided with internal gear teeth, a driven member, a rotative spur gear wheel, a pinion interposed between and meshing with said spur gear wheel and internal gear teeth, said pinion being journaled on said driven member, and a shiftable clutch member operatively connected with said spur gear wheel, and adapted to rotate when moved into clutching engagement with said driving member, and to be non-rotative when disengaged from said driving member.

9. In a device of the character described, the combination with an axle, of a driven member rotatably mounted upon said axle, a driving member operatively connected with a motor and provided with an annular friction surface, planetary gearing, comprising a spur gear wheel rotatably mounted upon the axle, an internal gear wheel surrounding said spur gear wheel and fixed to said driving member, and a pinion meshing with said spur and internal gear wheels and journaled on said driven member, a clutch member mounted upon said spur gear wheel to rotate therewith, and adapted to be shifted axially thereon, to engage and disengage the friction surface of said driving member, and manually operable means for shifting said clutch member.

10. In a device of the character described, the combination with an axle, of a driven member rotatably mounted upon said axle, a driving member operatively connected with a motor and provided with an annular friction surface, planetary gearing, comprising a spur gear wheel rotatably mounted upon the axle, an internal gear wheel surrounding said spur gear wheel and fixed to said driving member, and a pinion meshing with said spur and internal gear wheels and journaled upon said driven member, a clutch member mounted upon said spur gear wheel to rotate therewith, and adapted to be shifted axially thereon, to engage and disengage the friction surface of said driving member, and friction producing means adapted to engage said clutch member, when disengaged from the driving member, to restrain said clutch member and spur gear wheel from rotation.

11. In a device of the character described, the combination of a driving member, a driven member, planetary gearing interposed between said driving and driven members, and comprising a rotatable spur gear wheel, an internal gear wheel fixed to said driving member, a pinion journaled on said driven member and meshing with said internal and spur gear wheels, a clutch member operatively connected with said spur gear wheel, and adapted to be shifted into and out of clutching engagement with said driving member, tension means acting to move said clutch member in one direction and manually operable means acting to move said clutch member in the opposite direction.

12. In a device of the character described, the combination of a driving member, a driven member, planetary gearing interposed between said driving and driven members, and comprising a rotative spur gear wheel, an internal gear wheel fixed to said driving member, a pinion journaled on said driven member and meshing with said internal and spur gear wheels, a clutch member operatively connected with said spur gear wheel, and adapted to be shifted into and out of clutching engagement with said driving member, tension means acting to shift said clutch member into clutching engagement with said driving member, and manually operable means for shifting said clutch member out of engagement with said driving member.

13. In a device of the character described, the combination of a driving and a driven member, planetary gearing interposed between said driving and driven members, comprising an internal gear wheel fixed to said driving member, a plurality of pinions journaled on said driven member and meshing with said internal gear wheel, and a rotative spur gear wheel meshing with said pinions, a shiftable clutch member mounted upon said spur gear wheel, and means for moving said clutch member into and out of clutching engagement with said driving member, comprising a spring carried by said spur gear wheel and bearing upon said clutch member, and a shift ring operatively connected with said clutch member, and means for actuating said shift ring against the tension of said spring.

14. In a device of the character described, the combination of a driving member, provided with an annular friction surface, a driven member, planetary gearing interposed between said driving and driven members, and comprising a rotative spur gear wheel, an internal gear wheel fixed to said driving member, and pinions journaled on said driven member and meshing with said spur and internal gear wheels, a clutch member, comprising a disk mounted upon said spur gear wheel, to rotate therewith and axially shiftable thereon, and provided with a friction surface, a tension spring mounted on said spur gear wheel, and bearing against said clutch member to move the same into clutching engagement with said driving member, a non-rotative shift member in bearing engagement with said clutch member, and means for actuating said shift member, to move said clutch member out of clutching engagement with said driving member.

15. In a device of the character described, the combination of a driving member, a driven member, planetary gearing interposed between said driving and driven members, comprising a rotative spur gear wheel, an internal gear wheel fixed to said driving member, and pinions journaled on said driven member and meshing with said spur and internal gear wheels, a shiftable clutch member rotative with said spur gear wheel, and adapted to be moved into and out of clutching engagement with said driving member, and means for shifting said clutch member, comprising a non-rotative shift ring in bearing engagement with said clutch member, a rotative screw engaging said shift ring, and provided with a pinion, a gear wheel meshing with said pinion, and a lever adapted to rotate said gear wheel.

16. In a device of the character described, the combination of a driving member, a driven member, planetary gearing interposed between said driving and driven members, comprising a rotative spur gear wheel, an internal gear wheel fixed to said driving member, and pinions journaled on said driven member and meshing with said spur and internal gear wheels, a shiftable clutch member rotative with said spur gear wheel, and adapted to be moved into and out of clutching engagement with said driving member, and means for shifting said clutch member, comprising a non-rotative shift ring mounted adjacent to said clutch member, an antifriction bearing interposed between said ring and clutch member, a plurality of worm-screws in screw-threaded engagement with said shift ring, and provided with pinions, an internal gear ring meshing with said worm-screw pinions, and means for rotating said internal gear ring.

17. In a device of the character described, the combination of a driving member, a driven member, planetary gearing interposed between said driving and driven members, comprising an internal gear wheel, fixed to said driving member, a pinion meshing with said internal gear wheel, and journaled on said driven member, and a rotative spur gear wheel meshing with said pinion and provided with a sleeve, a shiftable clutch member shiftably mounted upon said sleeve of the spur gear wheel, a spring supported on said sleeve and bearing against said clutch member, to move the latter in one direction, and means including a shift ring engaging said clutch member to move the same in the opposite direction.

18. In a device of the character described, the combination of a driving member provided with a peripheral friction surface, a driven member, planetary gearing interposed between said driving and driven members, and comprising a normally non-rotative spur gear wheel, an internal gear wheel fixed to said driving member, and pinions journaled on said driven member and meshing with said internal and spur gear wheels, a friction member adjacent to said friction surface of said driving member, and spaced therefrom, a clutch member operatively connected with said spur gear wheel, and extending intermediate the friction surface of said driving member and said friction member, said clutch member being adapted to be moved into and out of clutching engagement with said driving member, and to be engaged by said friction member, to prevent the rotation of said clutch member when disengaged from said driving member.

19. In a device of the character described, the combination with an axle, of a driven member rotatably mounted upon said axle, a driving member provided with an annular friction surface, planetary gearing interposed between said driving and driven members, and comprising a spur gear wheel rotatably mounted upon the axle, an internal gear wheel fixed to said driving member, and pinions journaled on said driven member and meshing with said internal and spur gear wheels, a friction member fixed to said axle and provided with a friction surface adjacent to the friction surface of said driving member, a shiftable clutch member mounted upon said spur gear wheel to rotate therewith, and adapted to extend intermediate the friction surface of said friction member and said driving member, and means for shifting said clutch member into and out of clutching engagement with said driving member or with said friction member.

20. In a device of the character described, the combination with an axle, of a driven member rotatively mounted upon said axle, a driving member provided with an annular friction surface, planetary gearing interposed between said driving and driven members, and comprising a spur-gear wheel rotatably mounted upon the axle, an internal gear wheel fixed to said driving member, and pinions journaled on said driven member and meshing with said internal and spur gear wheels, a housing fixed to said axle and having a friction surface adjacent to and spaced from the friction surface of said driving member, a shiftable clutch member mounted upon said spur-gear wheel to rotate therewith and extending between the friction surfaces of said housing and driving member, said clutch member being adapted to engage either, or to be disengaged from both, of said friction surfaces of said housing and driving member.

21. In a device of the character described, the combination of a rotative driving member, a primary driven member, a change-speed gearing between said driving member and the primary driven member, including a rotative member which turns with the driving member when said driven member is rotated at one rate of speed, and is held from rotative movement when said driven member is rotated at another rate of speed, and means affording frictional engagement between said driving and rotative members, embracing a laterally shiftable, annular clutch member mounted upon said rotative member, and a coöperating friction surface upon said driving member.

22. In a device of the character described, the combination of a rotative driving member, a primary driven member, change-speed gearing between said driving member and the primary driven member, including a rotative member which turns with the driving member for driving the driven member at one rate of speed, and is held from rotative movement for driving said driven member at another rate of speed, and a friction-clutch mechanism, including a shiftable clutch member, mounted upon said rotative member and acting when moved in one direction to have frictional engagement with said driving member, and when moved in the opposite direction to be restrained from rotative movement.

23. In a device of the character described, the combination of a rotative driving member, a primary driven member, change-speed gearing between said driving member and the primary driven member, including a rotative member which turns with the driving member for driving the driven member at one rate of speed, and is held from rotative movement for driving said driven member at another rate of speed, and a friction-clutch mechanism, including a rotative clutch member turning with the driving member, a non-rotative annular clutch member and an intermediate, laterally movable clutch member having non-rotative connection with said rotative member; said intermediate clutch member acting when moved in one direction to connect said driving member with said rotative member, and when moved in the opposite direction to restrain said rotative member from rotative movement, and when in its neutral position leaving the primary driven member free to rotate independently of the driving member.

24. In a device of the character described, the combination of a rotative driving member, a primary driven member, change-speed gearing between said driving member and the primary driven member, including a rotative member which turns with the driving member for driving the driven member at one rate of speed, and is held from rotative movement for driving said driven member at another rate of speed, and a friction-clutch mechanism, adapted to connect said driving member with the rotative member, including a shiftable clutch member mounted upon said rotative member and adapted to have frictional engagement with said driving member, a spring tending to yieldingly hold said clutch member in its frictional engagement with said driving member, and means for operating said clutch member against the action of said spring to release the said rotative member from the driving member.

25. In a device of the character described, the combination of a central bearing member, an external, annular driving member, a primary driven member, change-speed gearing, including internal gear teeth on the driving member, a spur-gear wheel mounted on the bearing member and a plurality of gear pinions mounted on the driven member and intermeshing with the gear teeth on the driving member and with the spur-gear wheel, said driving member, rotative member and the gear pinions being provided with annular bearing surfaces having bearing engagement with each other, and a friction-clutch mechanism, including an annular clutch member on the driving member and a laterally shiftable clutch member having constant driving connection with said spur-gear wheel, and acting when moved in one direction to connect said driving member with the spur-gear wheel, and when moved in the opposite direction to release said spur-gear wheel from said driving member.

26. In a device of the character described, the combination of a central bearing member, an external, annular driving member, a primary driven member, a change-speed gearing, including internal gear teeth on the driving member, a spur-gear wheel member on the bearing member and a plurality of gear pinions mounted on the driven member and intermeshing with the gear teeth on the driving member and with the spur-gear wheel, said driving member, rotative member and the gear pinions being provided with annular bearing surfaces having bearing engagement with each other, a non-rotative, annular clutch member, an intermediate, laterally shiftable, annular clutch member having non-rotative connection with said spur-gear wheel, and an annular clutch member on said driving member; said intermediate clutch member acting when moved in one direction to connect said driving member with said rotative member, and when moved in the opposite direction to restrain said rotative member from rotative movement, and when in its neutral position leaving the primary driven member free to rotate independently of the driving member.

27. In a device of the character described, the combination of a central bearing member, an external, annular driving member, a primary driven member, change-speed gearing, embracing internal gear teeth on said annular driving member, a spur-gear wheel mounted on said bearing member, and a plurality of gear pinions mounted on the driven member and intermeshing with the gear teeth of the driving member and with said spur-gear wheel; said driving member, spur-gear wheel and gear pinions being provided with annular bearing surfaces in contact with each other, and a clutch mechanism, including an annular clutch member on the driving member, a fixed, annular clutch member located at one side of the said change-speed gearing, and a laterally shiftable clutch member, interposed between the fixed clutch member and said gearing, said shiftable clutch member having constant driving connection with said spur-gear wheel, and being adapted to act on either the driving member or the fixed clutch member.

In testimony that I claim the foregoing as my invention I affix my signature in the presence of two witnesses, this 28th day of November, A. D. 1914.

AXEL LEVEDAHL.

Witnesses:
M. WALSH,
C. E. GIFFORD.